United States Patent
Sandberg

(10) Patent No.: US 10,201,257 B2
(45) Date of Patent: Feb. 12, 2019

(54) OUTDOOR TOILET SUSPENSION SYSTEM AND METHOD OF USE

(71) Applicant: David Sandberg, Bountiful, UT (US)

(72) Inventor: David Sandberg, Bountiful, UT (US)

( * ) Notice: Subject to any disclaimer, the term of this patent is extended or adjusted under 35 U.S.C. 154(b) by 0 days.

(21) Appl. No.: 15/616,697

(22) Filed: Jun. 7, 2017

(65) Prior Publication Data
US 2017/0354301 A1   Dec. 14, 2017

Related U.S. Application Data

(60) Provisional application No. 62/348,821, filed on Jun. 10, 2016.

(51) Int. Cl.
| | | |
|---|---|---|
| *A47K 11/04* | (2006.01) | |
| *A47K 13/00* | (2006.01) | |
| *A47K 11/02* | (2006.01) | |
| *A62B 35/00* | (2006.01) | |

(52) U.S. Cl.
CPC ............ *A47K 13/005* (2013.01); *A47K 11/02* (2013.01); *A62B 35/0012* (2013.01); *Y02A 50/454* (2018.01)

(58) Field of Classification Search
CPC .......................... A47K 13/005; B62B 35/0012
USPC ............................................................. 4/483
See application file for complete search history.

(56) References Cited

U.S. PATENT DOCUMENTS

| | | | | |
|---|---|---|---|---|
| 6,223,854 | B1 * | 5/2001 | Nolz .................. | A41D 13/0007 182/133 |
| 6,546,569 | B2 * | 4/2003 | Figueras ................ | A47K 11/02 4/483 |
| 7,927,321 | B2 * | 4/2011 | Marland ................ | A47K 11/02 604/353 |
| 8,505,689 | B2 * | 8/2013 | Plouffe .................. | A47K 17/02 182/230 |
| 8,925,681 | B1 * | 1/2015 | Mattingly .......... | A62B 35/0006 182/3 |
| 2004/0154863 | A1 * | 8/2004 | Green ................... | A01M 31/02 182/7 |

\* cited by examiner

*Primary Examiner* — Huyen Le
(74) *Attorney, Agent, or Firm* — J. Todd Rushton

(57) ABSTRACT

A lightweight portable outdoor toilet system configured to support a user while facing toward a tree or another fixed anchor point during a personal moment. The system can be used to hover directly over the ground or with a detachable pouch configured to support a single use liner.

4 Claims, 4 Drawing Sheets

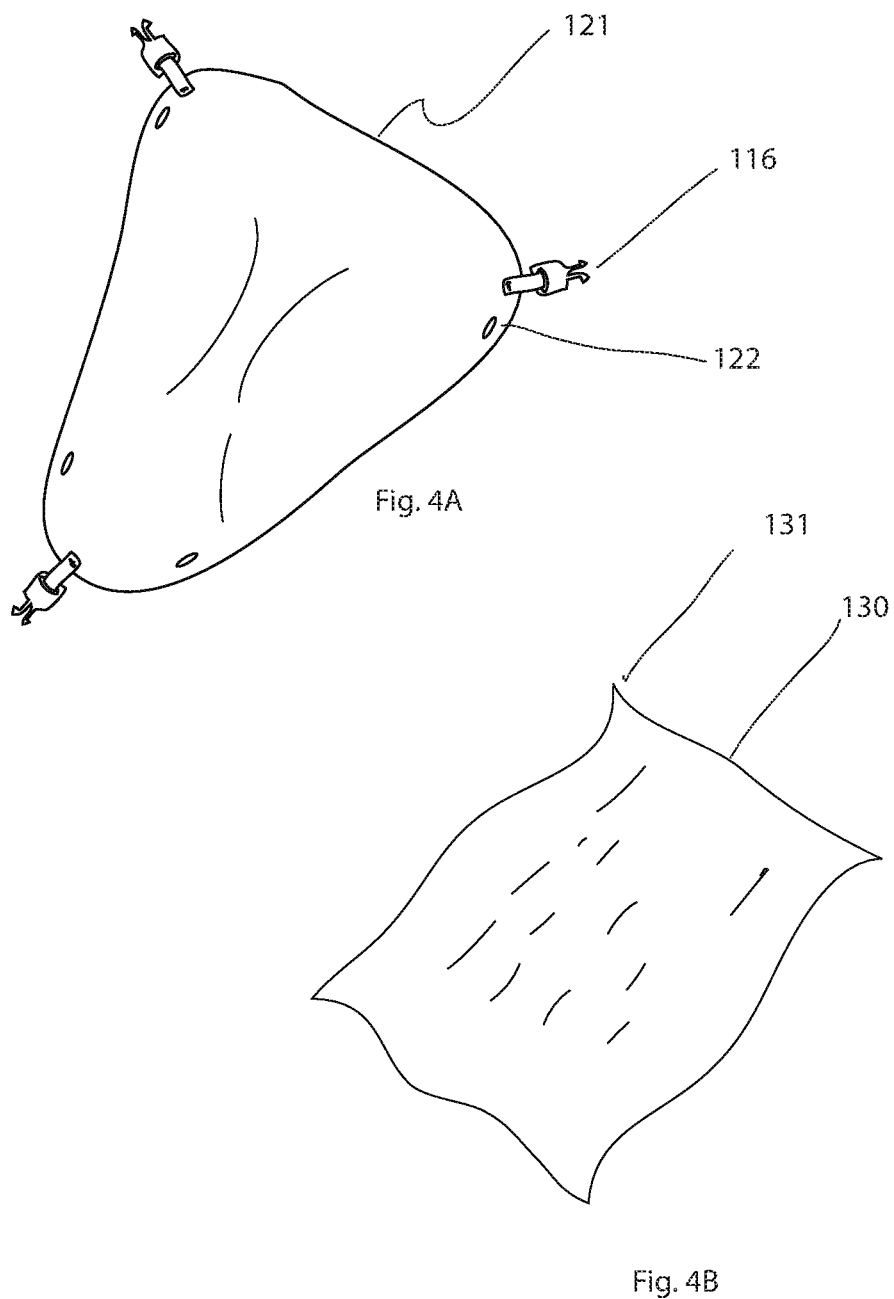

OUTDOOR TOILET SUSPENSION SYSTEM AND METHOD OF USE

The following application claims priority to U.S. Patent Office Provisional Application 62/348,821, filed Jun. 10, 2016; information therein incorporated by reference.

BACKGROUND

Spending time in the outdoors has many documented benefits toward a person's mental and physical wellbeing however; going to the bathroom is not one of them. Supporting your body weight while squatting to relieve yourself is an issue for female recreationists every time nature calls and the issue plagues men when there is a need for a full bowel movement.

Experienced recreationists will look for a rock or downed tree to at least partially sit, while others may try to lean against the trunk of a standing tree for support. This can be helpful but has its share of problems; trees and rocks are home for various types of wildlife, including insects, snakes and small mammals which may sting, bite or at least surprise you at an inopportune time. Rocks may have sharp edges or a rough texture that can damage exposed tender skin. A broken tree branch may turn out to be a real life "pain in the behind" and some types of trees are also covered with sticky pitch or sap. Most typically, the ground around the base of a tree slopes upward to meet the trunk, if a person chooses to lean their back against the trunk for personal business, the laws of nature are in force and any liquid deposited on the slope will run downhill toward their feet.

Another issue that arises in high-use recreational areas and in protected wilderness areas is the requirement for recreationists to carry out any solid waste. People may rely on zip-lock bags or disposable bottles for transportation of the waste but must use a spade to pick up the waste and place it in the container. Industry does offer some portable "wag bags" which are a sealable bathroom bags having an absorbent liner to control fluids and smell. However the opening for a wag bag can be small and it may be difficult to accurately hit the opening while hovering over the ground.

Others have tried to address the portable outdoor toilet issue but have not managed to solve all of the challenges in a single product.

What is needed is a personal outdoor toilet system, that supports the user comfortably during a personal moment, that it is lightweight, easy to use and can be used with a wag bag.

SUMMARY OF THE INVENTION

The disclosure of the present invention relates to a lightweight portable outdoor toilet system that will comfortably support a user facing toward a tree or another fixed anchor point during a personal moment. The system attaches to a single anchor point and is secured around the back and both thighs of the user. The system can be used to hover directly over the ground or with a detachable pouch configured to support a single use waste alleviation and gelling bag or WAG bag.

A first embodiment of the present invention is an OUTDOOR TOILET SUSPENSION SYSTEM or more specifically a lightweight suspension system which allows a user to squat or hover comfortably over the ground during a personal moment. The outdoor toilet including an extended webbing strap or cord configured to be looped around or attached to a fixed point such as a tree or a rock climbing anchor, the free end of the strap including a loop configured to receive a releasable attachment device such as a climbing carabiner. The body suspension portion including a back support loop configured to wrap around the user at the waist and attach to the extended strap at the carabiner. The back support loop allows the user to comfortably lean back into the loop. To additionally support the user, leg support or thigh support loops are attached into the back support loop at the mid-point of each side of the loop or proximate the hip bones of the user. The free ends of the thigh support loops configured to extend between the users legs and to also attach into the carabiner forming a three-point connection between the suspension system and the extended strap.

In one embodiment of the present invention the back support loop includes a padded section configured to engage the users lower back.

In another embodiment of the present invention, the thigh support loops includes ladder-lock buckles proximate the fixed junction with the back support loop. This allows the user extend the length of the thigh support loops for those with larger thighs or snug the straps for personal comfort. It is found that the thigh support loops provide additional comfort while squatting or hovering and operate to separate the thighs and buttocks during evacuation and allows for easy hygiene following a personal moment.

In yet another embodiment, the outdoor toilet of the present invention includes a lower pouch or bag configured to be suspended under the buttocks and between the legs of the user. The lower pouch configured to be releasably attached at three or more points. In one embodiment, two connection points are on the back support loop spaced behind the users back with two additional connection points towards the front of the thigh support loops, outside of the user's thighs. In another embodiment there are two connection points at the rear of the user, a single connection point in front, toward the loop end of the back support strap and adjustable loops or clips positioned on the lower bag configured to be attached to the back support strap proximate the users hip bones. The lower pouch is configured to be lined with a plastic waste lining or a wag bag and is then extended between the users legs and attached at the front pouch attachment points. This allows the user to separate their legs to adjust the alignment of the pouch and wag bag before evacuating into the wag bag opening. The lower pouch can then be released from the front of the back support loop, allowing the user to easily move the wag bag behind them without incidental contact with the bag or the contents. In one embodiment the lower pouch may include button holes or fasteners to secure the position of the plastic liner or wag bag.

In yet another embodiment of the present invention the lower bag will be secured to the suspension system using 5 attachment points. Two connection points are on the back support loop spaced behind the users back, two additional connection points towards the front of the thigh support loops, outside of the user's thighs with the last connection point proximate the free ends of the back support loop and the thigh support loops. In one embodiment the connection is made using releasable buckles such as Fastex® or a similar device. Connection may also be accomplished using a simple fabric loop.

It is contemplated that all components of the outdoor toilet suspension systems are easily washable and field maintainable.

One embodiment of the present invention may include accessory loops, allowing the user to attach items such as hand sanitizer, soap, feminine hygiene products or toilet paper for easy access during the personal moment. Roll toilet paper may also be attached by threading the support webbing through the toilet paper roll backer tubing.

BRIEF DESCRIPTION OF DRAWINGS

The following description of the embodiments can be understood in light of the Figures which illustrate specific aspects of the embodiments and are part of the specification. Together with the following description, the Figures demonstrate and explain the principles of the embodiments. The same reference numerals or word descriptions in different drawings represent the same element, and thus their descriptions may be omitted.

FIG. 4A is one embodiment of a lower pouch assembly, and, FIG. 4B is a plastic liner for use with the lower pouch.

Figure 1:
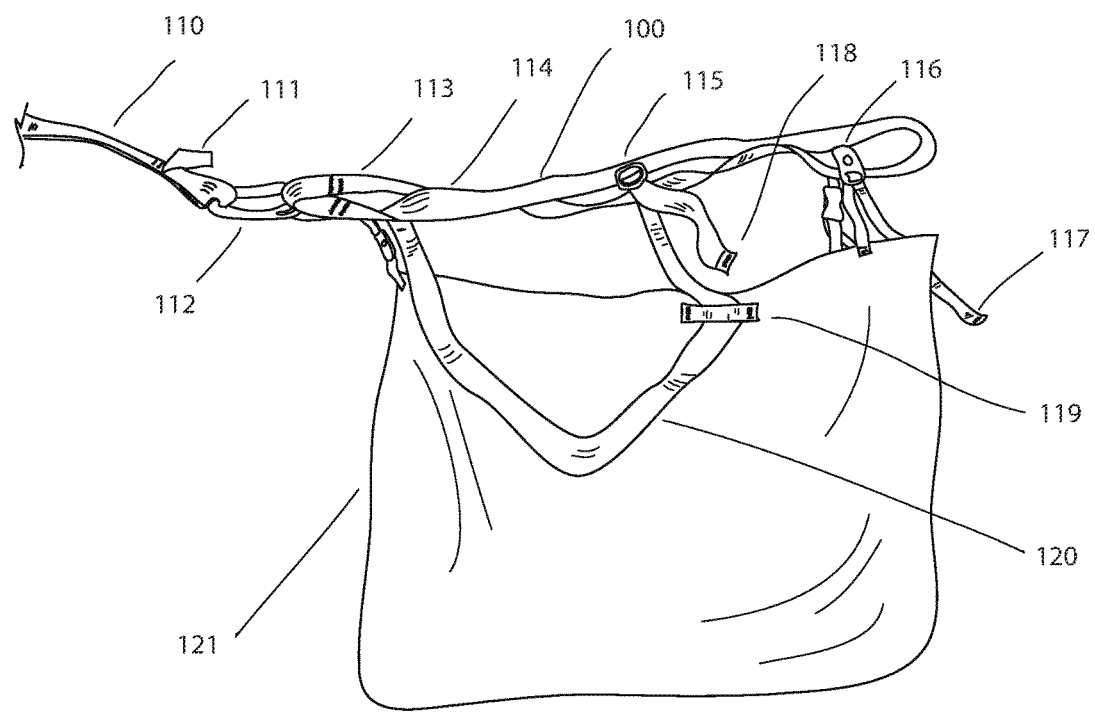
FIG. 1 is a first embodiment of an outdoor toilet.

It is to be understood that the above mentioned arrangements are only illustrative of the application of the principles of the present disclosure. Numerous modifications or alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations form, function and manner of operation, may be made without departing from the principles and concepts set forth herein.

DETAILED DESCRIPTION OF THE DRAWINGS

Figure 2:
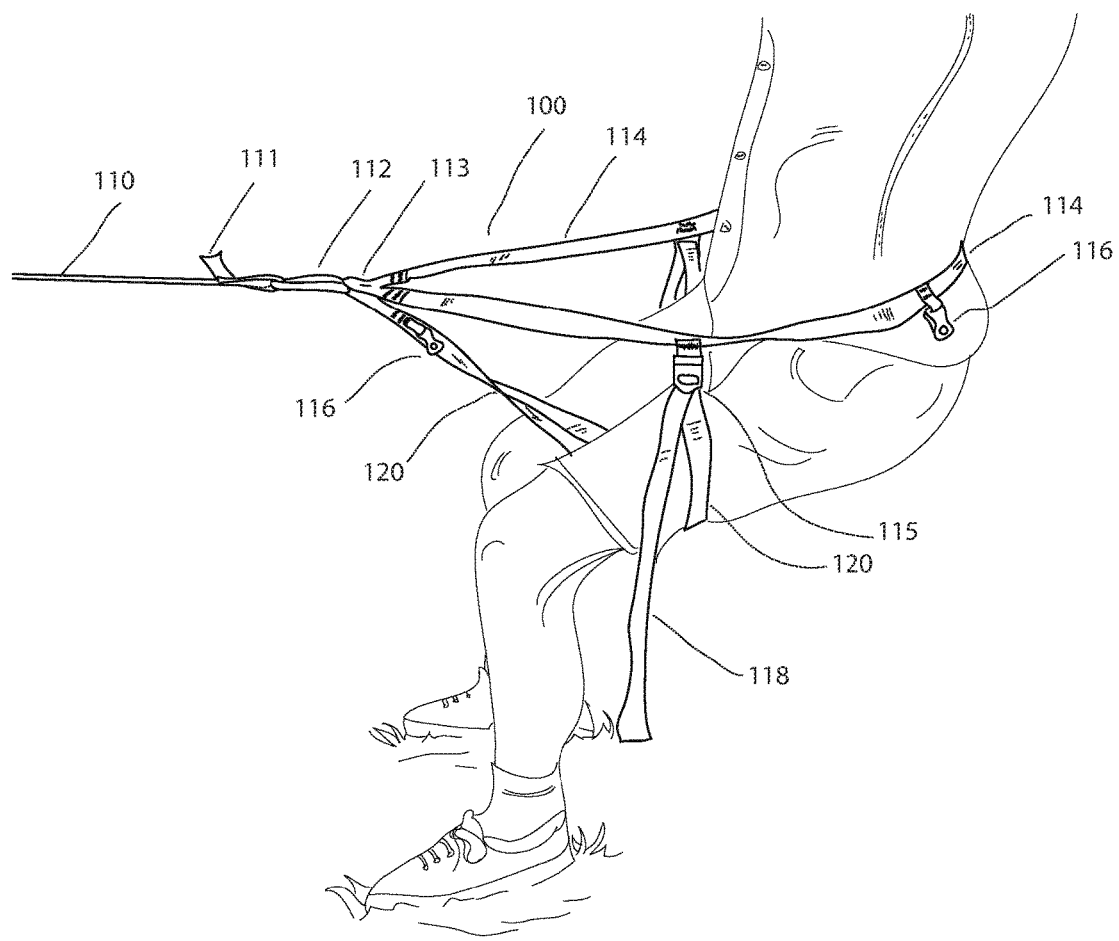
FIG. 2 is a first embodiment of an outdoor toilet configured to a user.
Figure 3:
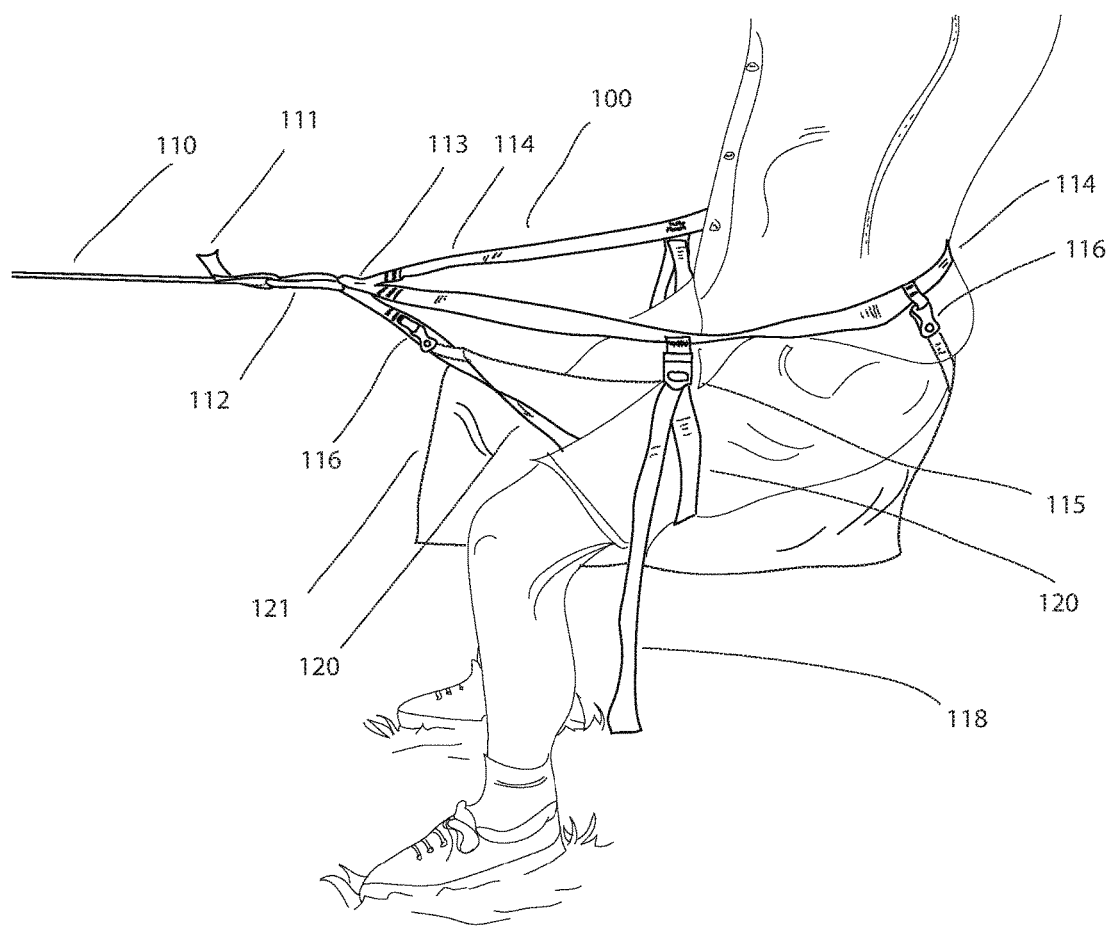
FIG. 3 is a first embodiment of an outdoor toilet configured to a user with a lower pouch.

FIGS. 1 through 3 of the present invention or outdoor toilet 100 includes an extended cord or webbing tree strap 110 configured to be attached to a fixed anchor point, the free end of the strap 111 configured to receive a releasable device such as a climbing carabiner 112. A back support strap 114 configured to extend around the back of the user and having a loop end 113 which is attached to the extended strap 110 at the carabiner 112. Thigh straps or loops 120 are attached to the back support strap 114 at the mid-point using an adjustable buckle 115 of each side or proximate the users hips. The thigh straps 120 configured to extend between the users legs and having a free end formed into a loop which are also attached to the carabiner 112 forming a three point connection arrangement. In one embodiment the thigh loops 120 are adjusted by pulling or passing an excess tag end 118 through ladder lock hardware 115 or similar device. A lower pouch 121 may be connected to the support straps 114, 120 using releasable buckles 116 and in one embodiment, pass through loops 119 sewn directly to the lower pouch 121. The lower pouch 121 configured to be used in conjunction with a plastic liner or a commercially available wag bag.

FIGS. 4A and 4B is one embodiment of the lower pouch assembly 121 including a plurality of releasable buckles configured to be attached the lower pouch 121 to straps 120, 114. One embodiment of the lower pouch 121 includes loops 119 (FIG. 1) used to further open the lower pouch 121 during use. A plastic liner 130 or WAG bag can be used to protect the lower pouch 121; button holes or loops 122 can used secure the corners 131 of liner 130 into the lower pouch 120.

FIGS. 2 and 3 additionally show the present invention with a user. The extended strap 110 is attached to a fixed anchor point such as tree or rock. The user when facing the anchor will extend the back support loop 114 around their waist and each thigh support loop 120 is extended between the legs. The free ends 113 can then be retained with the carabiner 112. It is recommended that the user adjust the thigh support loop 120 towards the outside of the buttocks before sitting back or squatting into the harness 100. In one embodiment the user can adjust the ladder lock buckles 115 to customize the fit of the thigh loops.

The optional lower pouch assembly 121 is attached to the back support loop 114 at a plurality points allowing the pouch 121 to be placed between the legs of the user and spread open during use. The releasable buckles 116 allow the user to move the lower pouch 121 out of the way after use or during clean up.

The invention claimed is:

1. An outdoor toilet suspension system, comprising;
   an extended strap,
   a back support strap,
   a pair of thigh support straps,
   a releasable support clip at the end of the extended strap,
      a releasable lower pouch configured to be attached to the back support strap and the thigh support straps, and,
      the lower pouch includes a plurality of liner attachment points.

2. The outdoor toilet of claim 1 wherein the length of the thigh support straps is adjustable.

3. The outdoor toilet of the claim 2 including a liner.

4. A method of using an outdoor toilet suspension system, comprising:
   providing a suspension system, comprising;
      an extended strap,
      a back support strap,
         the back support strap having loop ends,
      a pair of thigh support straps,
         each of the thigh support straps connected together at a loop end,
      a releasable support clip at the end of the extended strap,
   attaching the extended strap to a fixed anchor point,
   wrapping the back support strap around the user,
   passing the loop end of the thigh support straps between the legs of the user,
   connecting the loop end of the back support strap and the loop end of the thigh support straps to the releasable support clip,
   providing,
      a plurality of releasable pouch clips attached to the back support strap and the thigh support straps,
      a lower pouch,
      the lower pouch having a plurality of liner attachment points, a liner,
   attaching the lower pouch to the plurality of releasable pouch clips,
   inserting the liner into the lower pouch, and,
   attaching the liner to the lower pouch at the liner attachment points.

* * * * *